Dec. 5, 1967  C. E. OCKERT  3,356,584

FUEL PELLET FOR NUCLEAR REACTOR

Filed Nov. 18, 1966

INVENTOR.
Carl E. Ockert
BY

ATTORNEY.

United States Patent Office 3,356,584
Patented Dec. 5, 1967

3,356,584
FUEL PELLET FOR NUCLEAR REACTOR
Carl E. Ockert, Broomall, Pa., assignor to the United States of America as represented by the United States Atomic Energy Commission
Filed Nov. 18, 1966, Ser. No. 595,541
6 Claims. (Cl. 176—67)

ABSTRACT OF THE DISCLOSURE

This disclosure describes improved ceramic fuel pellets for use in rod-type nuclear reactor fuel elements. The ceramic fuel pellets, which are preferably annular in shape, are provided with longitudinal slots along their inner and/or outer lateral surfaces in order to decrease the effect of pellet temperature or irradiation induced growth in creating tensile hoop stresses in the tubular cladding enclosing the pellets.

---

The invention described herein was made in the course of, or under, a contract with the U.S. Atomic Energy Commission. It relates generally to nuclear reactor fuel elements of the rod type, and more specifically to ceramic fuel pellets for rod-type fuel elements which develop compressive hoop stresses in a high temperature and radiation environment.

Rod-type fuel elements are widely used in nuclear reactors of the pressurized and boiling water types as well as in gas-cooled reactors. Such fuel elements generally comprise a tubular member forming a jacket or cladding for a multiplicity of generally cylindrical ceramic fuel pellets disposed therein. End plugs or caps are used to seal the ends of the tubes and complete a leak-tight enclosure for the fuel pellets. The tubular member or cladding prevents the loss of fuel and escape of fission products to the reactor coolant, protects the fuel pellets from corrosion by the coolant, and provides structural strength to the fuel element to prevent it from collapsing or shifting from a preselected position within a fuel element assembly. Individual rods are assembled into bundles or fuel element assemblies which are then grouped together with other assembles to form a reactor core capable of supporting a self-sustaining fission chain reaction.

A problem long associated with rod-type fuel elements has been that of maintaining the integrity of the cladding in high temperature and radiation environments. Fuel pellets of the widely used ceramic type such as uranium dioxide exhibit radial growth under such environmental conditions and develop large hoop stresses in their radial peripheral regions when they are restrained by the surrounding cladding which exhibits a smaller growth rate. Tensile hoop stresses develop in the cladding as a result of the differential radial growth in reaction to the compressive hoop stresses in the pellets. The ability of the fuel pellets to develop and maintain a compressive hoop stress determines the upper limit of stress developed in the pellets and cladding. The cladding is in effect creating the compressive hoop stress in the pellet by restricting its growth and developing its own tensile hoop stress as a result of such restriction.

Large tensile hoop stresses in the cladding often result in its failure with consequential losses of fuel and fission products to the reactor coolant. The highly undesirable safety hazard associated with such losses is well known in the nuclear reactor art and is the subject of elaborate safeguards in existing reactors.

One approach to the problem of maintaining cladding integrity is to simply increase the thickness of the cladding, thereby reducing the tensile hoop stresses developed therein. This approach has other undesirable effects, however, inasmuch as it increases the amount of parasitic neutron absorption in the fuel element, and decreases heat transfer from the rods to the reactor coolant by increasing the temperature drop across the cladding.

Increasing the clearance between the fuel pellets and cladding to provide expansion space for the pellet also decreases the hoop stress in the cladding by reducing the interference between pellet and cladding when the pellet grows. Such clearances substantially reduce heat transfer from the fuel rod, however, by creating large temperature drops between the pellet and cladding. Intimate contact between the cladding and fuel pellets is, therefore, necessary in order to maintain maximum heat transfer rates without requiring excessively high fuel pellet temperatures.

It is, accordingly, a general object of the invention to provide a fuel pellet for rod-type fuel elements which develops minimum compressive hoop stresses.

Another object of the invention is to provide a rod-type fuel element design wherein low tensile hoop stresses are experienced by the fuel cladding during operation.

Other objects of the invention will become apparent from an examination of the following description of the invention and the appended drawings wherein.

In accordance with the invention, an improved fuel pellet for rod-type fuel elements is provided. Radially oriented longitudinal slots of relatively great depth compared to their widths are provided in the internal and/or external lateral surfaces of annular fuel pellets in order to reduce the compressive hoop stresses which develop within the pellet during operation due to its confinement within a tubular cladding in a high temperature and radiation environment. Reduction in compressive hoop stresses in the fuel pellet causes a corresponding reduction in tensile hoop stresses in the fuel rod cladding thereby achieving the primary object of the invention.

Figure 1:
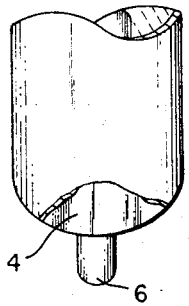
FIG. 1 is an isometric view, partly cut away, of a typical fuel rod containing prior art type annular fuel pellets.

In order to facilitate an understanding of the invention, reference is made to the drawings, initially to FIG. 1 wherein a typical fuel rod containing simple annular fuel pellets is illustrated. Annular ceramic fuel pellets 1 are shown disposed within a tubular cladding 2 which provides structural support to the fuel pellets as well as protecting them from the corrosive and erosive effects of reactor coolant. The tubular cladding 2 is sealed at its ends by plugs 3 and 4 which may include extensions 5 and 6, respectively, to facilitate mounting of the rod in a fuel element assembly. Plugs 3 and 4 may be sealed to tubular cladding 2 by welds 7 along the adjacent terminal ends of the plug and cladding.

Figure 2:
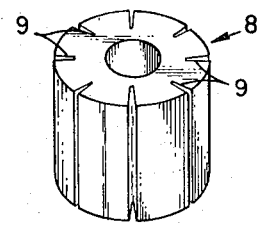
FIG. 2 is an isometric view of an improved fuel pellet having longitudinal slots in its external lateral surface in accordance with the present invention.

FIG. 2 illustrates an annular fuel pellet 8 having uniformly spaced longitudinal slots 9 in its external lateral surface. Although an annular pellet is preferred because of the known reduction in hoop stresses provided by large central perforations through the pellet, longitudinal slots according to the invention will also effectively reduce the hoop stress in solid cylindrical fuel pellets. The hoop stress reducing characteristics of the central perforations and slots are additive, however, and the use of both features in the same fuel element produces a greater net reduction in hoop stress than would be achieved through the use of the longitudinal slots alone.

Figure 3:
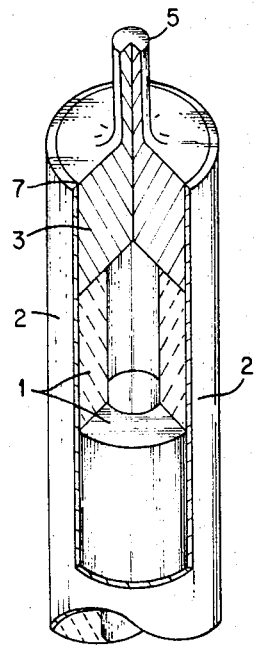
FIG. 3 is an isometric view of an improved annular fuel pellet having longitudinal slots in both its internal and external lateral surfaces in accordance with the present invention.
Figure 3:
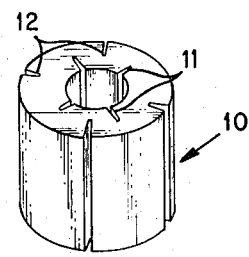

FIG. 3 illustrates an alternative embodiment of the invention wherein an annular fuel pellet 10 is provided with uniformly spaced longitudinal slots 11 in its internal lateral surface as well as uniformly spaced longitudinal slots 12 in its external lateral surface. As shown, slots 11 are spaced angularly intermediate slots 12 in order to minimize the reduction in pellet strength caused by the slots while providing a maximum reduction in hoop stress. The use of internal as well as external slots permits a reduction in the number of external slots required for any given reduction in hoop stresses, and minimizes the increase in temperature which results in the central region of the fuel pellet as a result of heat transfer losses attributable to the effect of the external slots in reducing the available heat transfer area between the fuel pellet and cladding. As a result, the radial thickness of an annular pellet may be slightly increased providing improved space utilization within any given temperature limitation.

The number and width of the slots are selected to provide a minimum loss of fuel volume in the pellet while avoiding the development of excessive circumferential hoop stresses in the pellet during its lifetime. The full protection of the slots in reducing compressive hoop stresses is obtained only as long as they remain open. Fuel growth tends to close the slots with time whereupon compressive hoop stresses develop. Thus, the number and width of the slots are directly related to the amount of growth which a given fuel pellet experiences during its lifetime. The number of slots multiplied by their widths represents an expansion space which must be filled by the growing fuel before it can develop compressive hoop stresses.

The remaining unslotted fuel portion of the pellet shown in FIG. 2 is located in a higher temperature region of the pellet where the ceramic is much weaker and more plastic than in the cooler slotted fuel portion. Since all of the compressive hoop stress must be carreid through the unslotted portion which is at plastic temperatures, the net effect is that the fuel pellet cannot generate high hoop stresses under high temperature operating conditions. The fuel pellet of FIG. 3, being slotted in both high and low temperature regions, cannot support high hoop stresses even at low temperatures.

Full protection from hoop stresses during the entire lifetime of the fuel pellet and cladding may be unnecessary and even undesirable in some cases where some level of tensile hoop stresses in the cladding is tolerable near the end of the fuel lifetime. This is especially true where the maximum fuel volume is desired in the pellets. In such a case the number and width of the slots may be selected so that the expansion space provided by the slots is inadequate over the entire pellet lifetime and the slots grow closed. The hoop stresses developed after the slots grow closed will be considerably smaller than the hoop stresses which would have developed in an unslotted pellet at the same point in its operating lifetime where the unslotted pellet is otherwise identical. This difference in hoop stresses results even though the slots have grown closed in the slotted pellet, because the slots effectively negate all pellet growth which preceded their closing. Thus, slotted pellets according to the invention can be designed to provide virtually any degree of hoop stress reduction desired depending on the individual needs of a given rod-type fuel element.

In fabricating annular fuel pellets according to the invention, it is preferable to provide them with slots having slightly rounded root portions so as to avoid initiating cracks therein. Such cracks are generally undesirable in annular pellets inasmuch as fuel displacement may result therefrom. Where solid pellets are used, slots having rounded or sharp roots may be used therein inasmuch as cracking in solid fuel pellets does not create serious fuel displacement problems.

Selection of slot depth requires a compromise between manufacturability, pellet strength, fuel volume reduction and the reduction of compressive hoop stresses during operation. Since the relative importance of these factors will vary from one case to another, no single slot depth can be considered ideal. Slots depths equal to about half the thickness of the annular fuel pellet have been found to provide a good compromise between these factors. Shallower slots could be used, of course, if less protection against hoop stresses is required, or greater pellet strength is needed to insure against handling damage. On the other hand, slots deeper than half the thickness further increase the probability of handling damage and reduce the fuel volume of the pellets.

At least six longitudinal slots are desirable in fuel pellets having a single slotted surface as in FIG. 2. Eight to twelve slots are considered more desirable, however, in order to minimize the effects of friction between the pellet and cladding on those portions of the fuel pellet between slots. Where two slotted surfaces are provided, as in the pellet illustrated in FIG. 3, four to six slots in each surface are sufficient.

Fabrication of slotted fuel pellets according to the invention requires a knowledge of the growth characteristics of the particular compacted fuel material used in the pellets. The growth characteristics of the particular tubular cladding in which the fuel pellets are to be inserted are also important as it is the differential growth between the tubular cladding and the pellets disposed therein that gives rise to the hoop stresses which the invention avoids. Thus, the number and size of slots must be determined according to considerations which change in each case and a single set of numerical values would not satisfactorily apply in all cases. As pointed out earlier, moreover, less than the full protection achievable according to the invention may be desirable in a given case, and the expansion space provided by the slots may be reduced accordingly. It follows, therefore, that the invention is not limited by any particular size or number of slots, but relates generally to the incorporation of such slots in fuel pellets to provide a reduction in the tensile hoop stresses which result in tubular cladding members enclosing such pellets when the pellet grows at a greater rate than the cladding during operation in a nuclear reactor.

The above description of the invention was offered for illustrative purposes only, and should not be interpreted in a limiting sense. It is intended rather that the invention be limited only by the claims appended hereto.

What is claimed is:

1. An improved ceramic fuel pellet for use in a rod-type nuclear reactor fuel element, wherein said ceramic fuel pellet is disposed within a tubular cladding, comprising: a nuclear fuel pellet having a generally cylindrical external lateral surface, said fuel pellet having a plurality of longitudinal slots in said external lateral surface, the depth of each of said slots being substantially greater than its width, said slots having rounded root portions to minimize crack formation in said fuel pellet due to said slots, said slots providing expansion room for pellet growth and thereby reducing the tensile hoop stresses induced in said cladding by said pellet.

2. An improved ceramic fuel pellet for use in a rod-type nuclear reactor fuel element, wherein said ceramic fuel pellet is disposed within a tubular cladding, comprising: an annular ceramic fuel pellet having generally cylindrical internal and external lateral surfaces, said fuel pellet having a plurality of longitudinal slots in each of said internal and external lateral surfaces, the depth of each of said slots being substantially greater than its width, said slots providing expansion room for pellet growth and thereby reducing the tensile stresses induced in said cladding by said pellet.

3. The fuel pellet of claim 2 wherein said slots in each of said lateral surfaces are uniformly spaced.

4. The fuel pellet of claim 2 wherein said slots in said internal surface are spaced angularly intermediate said slots in said external surface.

5. The fuel pellet of claim 2 wherein said slots have rounded root portions to minimize crack formations in said pellet due to said slots.

6. The fuel pellet of claim 2 wherein at least four of said slots are provided in said external surface and at least four of said slots are provided in said internal surface.

References Cited

UNITED STATES PATENTS

| | | | |
|---|---|---|---|
| 3,034,975 | 5/1962 | Beurtheret | 176—90 X |
| 3,043,761 | 7/1962 | Reynolds | 176—90 X |
| 3,135,665 | 6/1964 | Koutz et al. | 176—90 X |
| 3,184,392 | 5/1965 | Blake | 176—73 X |

FOREIGN PATENTS 920,577   3/1963   Great Britain.

CARL D. QUARFORTH, *Primary Examiner.*

M. J. SCOLNICK, *Assistant Examiner.*